(12) United States Patent
Cruysen et al.

(10) Patent No.: US 7,133,742 B2
(45) Date of Patent: Nov. 7, 2006

(54) DEVICE AND METHOD FOR PROCESSING SLAUGHTER ANIMALS AND/OR PARTS THEREOF PROVIDED WITH A TRANSPORTATION SYSTEM

(75) Inventors: Petrus Wilhelmus Hendrikus Cruysen, Escharen (NL); Jan Willem Beeftink, Escharen (NL); Adrianus Josephes van den Nieuwelaar, Gemert (NL)

(73) Assignee: Stork PMT B.V., Boxmeer (NL)

( * ) Notice: Subject to any disclaimer, the term of this patent is extended or adjusted under 35 U.S.C. 154(b) by 198 days.

(21) Appl. No.: 10/922,633

(22) Filed: Aug. 19, 2004

(65) Prior Publication Data

US 2005/0061621 A1 Mar. 24, 2005

(30) Foreign Application Priority Data

Aug. 22, 2003 (NL) .................................... 1024150

(51) Int. Cl.
| | |
|---|---|
| *G06F 7/00* | (2006.01) |
| *B65G 37/00* | (2006.01) |
| *B65G 47/10* | (2006.01) |
| *B65G 47/46* | (2006.01) |
| *B65G 43/00* | (2006.01) |
| *B65G 43/08* | (2006.01) |
| *B65G 47/00* | (2006.01) |

(52) U.S. Cl. ....................... 700/226; 700/225; 700/230; 198/349; 198/349.5; 198/349.95; 198/349.7; 198/464.1; 198/502.3; 198/678.1

(58) Field of Classification Search ................. 700/215, 700/226, 230, 224, 225; 198/349, 349.5, 198/349.6, 349.7, 349.8, 349.9, 349.95, 465.4, 198/464.1, 502.3, 678.1

See application file for complete search history.

(56) References Cited

U.S. PATENT DOCUMENTS 3,722,425 A * 3/1973 Allen ....................... 104/88.05

4,597,495 A * 7/1986 Knosby ....................... 209/3.3

(Continued)

FOREIGN PATENT DOCUMENTS

DE 10046053 A1 4/2002

(Continued)

*Primary Examiner*—Gene O. Crawford
*Assistant Examiner*—Ramya G. Prakasam
(74) *Attorney, Agent, or Firm*—Birch, Stewart, Kolasch & Birch, LLP

(57) ABSTRACT

A device for processing slaughter animals or parts thereof, for example poultry, comprises a transport system with an endless track and a chain of chain elements which can be moved along the track, wherein a plurality of chain elements are set up as carriers to carry one or more slaughter animals and/or parts thereof. The device furthermore has a delivery station for delivering slaughter animals or parts thereof to the carriers of the transport system, one or more stations being set up along the track of the transport system to perform actions relating to the slaughter animals or parts thereof. The device furthermore has location means for determining the position of the chain in relation to the track, wherein the location means comprise an identifiable chain element which has an associated identification mark, and also an identification sensor set up along the track to detect each identifiable chain element, wherein the remaining chain elements in the chain are designed as unidentifiable chain elements. The location means furthermore comprise a counting device to count the unidentifiable chain elements which pass along a counting station by the track following the passage of an identifiable chain element. Moreover, the location means furthermore comprise electronic memory means with a memory table in which a memory field is provided for each carrier, wherein the location means record a variable in the memory field representing the number of carriers counted by the counting device since the passage of the identifiable chain element located upstream.

29 Claims, 2 Drawing Sheets

U.S. PATENT DOCUMENTS

| | | | |
|---|---|---|---|
| 4,610,361 A * | 9/1986 | Elliot | 209/555 |
| 4,627,007 A * | 12/1986 | Muschany | 452/157 |
| 5,993,308 A * | 11/1999 | Martin et al. | 452/177 |
| 6,148,249 A * | 11/2000 | Newman | 700/225 |
| 6,166,637 A * | 12/2000 | Cyr et al. | 340/572.7 |
| 6,196,912 B1 * | 3/2001 | Lawler et al. | 452/173 |
| 6,231,435 B1 * | 5/2001 | Pilger | 452/157 |
| 6,383,069 B1 * | 5/2002 | Volk et al. | 452/188 |
| 6,452,497 B1 * | 9/2002 | Finlayson | 340/572.8 |
| 6,494,305 B1 * | 12/2002 | Black et al. | 198/349 |
| 6,975,233 B1 * | 12/2005 | Grose et al. | 340/573.1 |

FOREIGN PATENT DOCUMENTS

| | | |
|---|---|---|
| NL | 1001029 | 2/1997 |
| WO | WO 93/13671 | 7/1993 |
| WO | WO 00/13515 | 3/2000 |

* cited by examiner

DEVICE AND METHOD FOR PROCESSING SLAUGHTER ANIMALS AND/OR PARTS THEREOF PROVIDED WITH A TRANSPORTATION SYSTEM

FIELD OF THE INVENTION

This application claims priority to Netherlands patent application no. 1024150, filed Aug. 22, 2003.

The invention relates to a device and method for processing slaughter animals, in particular poultry, and/or parts thereof, using a transport system. The transport system is of the type with an endless track and a chain of chain elements, including carriers, each designed to carry one or more slaughter animals or part or parts thereof. The transport system is provided with drive means for moving the chain of carriers along the track in a direction of transport.

BACKGROUND OF THE INVENTION

In large slaughterhouses which are designed for processing poultry, for example chickens; transport systems occur in current practice with many thousands of carriers in a chain. Slaughter lines are known with 15,000 to even 30,000 carriers in a single chain, which may be kilometres long. Between adjacent carriers, different types of chain elements are present, for example one or more links of a chain or a piece of cable, steel wire or the like, which interconnect the carriers.

A plurality of transport systems are often present in slaughterhouses, wherein it occurs that a part of a poultry item held by a carrier in a first transport system is separated and the separated part of the poultry item is transferred to a carrier which forms part of a second transport system.

For example in this situation, it is important during the slaughter process to know the location of the carriers in each of the transport systems. It can thus occur that an inspection station is set up along the second transport track, where a veterinary inspection of passing separated poultry item parts takes place. If a poultry item part is then rejected, it is desirable, and sometimes required, that the associated poultry item part which is still located in the first transport system is also rejected and is treated as such, for example is removed in a reject station. The slaughterhouse installation must then be able to locate the relevant carrier in the first transport system.

In order to be able to locate the carriers in the transport system, as presently used in slaughterhouses, location means are present which can determine at least the position of the chain of carriers in relation to the track.

In a known design of these location means, a single identifiable chain element is present in the chain which has an identification mark, said chain element being referred to as the reference chain element, and the remaining chain elements in the chain are designed as unidentifiable. An identification sensor is then set up along the track to detect the identifiable reference chain element.

The known location means further comprise a counting device set up at a position along the track, usually near the identification sensor, to count the carriers which pass following the passage of the reference chain element.

Furthermore, the known location means comprise electronic memory means with a memory table in which at least one memory field is present for each carrier, wherein the location means record a variable in a memory field for each carrier representing the number of carriers counted by the counting device since the passage of the reference chain element.

In the known transport system described above, a serial number is, in a manner of speaking, allocated to each carrier, starting from the reference chain element. In practice, the memory table comprises, for each carrier, along with the memory field with the serial number of the carrier, also one or more memory fields in which other information can be stored. For example, data relating to the relevant product can also be stored in a memory field of this type, such as the weight or the like.

In an embodiment generally known in practice, the carriers are designed as trolleys which can be moved along a guide rail, with running wheels which engage on the rail. Furthermore, each carrier is provided with a receiver part to receive a slaughter animal or one or more parts thereof.

It is known for a sensor to be set up along the guide rail which is operated under the influence of a passing trolley of a carrier. The reference chain element is then obtained in a known design by placing a bridge piece, in practice a spring, between the running wheels of two adjacent trolleys, said spring operating the relevant sensor as if it related to the passage of a trolley. This longer operating period compared with the passage of a normal trolley is electronically identified and the reference chain element is thus detected in the chain. Furthermore, the sensor performs the counting of the passing trolleys and therefore the carriers. It is known for the sensor to be designed as an element which can be mechanically moved by the passage of a running wheel and which cooperates with an electronic detector, for example an inductive detector.

In a different known variant, an optical sensor which detects each passage of a carrier is placed along the guide rail. An additional chain element is set up between two adjacent carriers in the chain, which can be detected in the same way as a carrier by the optical sensor. The passage of this additional chain element can easily be determined on the basis of the shorter time lapse between successive detections, whereby the reference chain element is then defined.

The transport systems described above essentially operate satisfactorily in slaughterhouses.

However, a problem occurs, for example, in the event of a power failure. This power failure can affect the drive means of the chain and/or the identification sensor and/or the electronic memory means. As a result, even if no apparent problems have occurred within the location means, uncertainty arises concerning the position of the chain in relation to the track and therefore the location of the carriers and products carried thereby in relation to the track and the associated stations.

In terms of food safety, uncertainty of this type in a slaughterhouse for, for example, poultry, is undesirable.

In order to eliminate this uncertainty, in the known transport system the chain is moved on in a "restore routine" until the single reference chain element is again detected by the identification sensor. During this "restore routine", no new products may of course be added, products removed or actions carried out.

It will be clear that, in the case of a long chain, as described above, the duration of the "restore routine" may be unacceptably long.

Another problem with long chains relates to the loss of a carrier, for example due to a carrier breaking off from the chain. In the present approach, a loss of this type is identified at an undesirably late stage, and a large number of the slaughter animals or parts thereof located in the carrier may possibly have to be rejected on food safety grounds.

Finally, as a result of the great length of the chain, in the event of an emergency stop or the like, the carriers may move back against the direction of transport because the chain had been stretched during operation and this stretch is then released. As a result, the location means may, in a manner of speaking, perform a counting error.

An obvious solution to the aforementioned problems is to design all carriers as identifiable carriers and to provide each carrier with a unique identification mark. Each carrier can then possibly be designed to be provided with a remotely readable electronic transponder with a unique code, or to be provided with a readable graphical code, for example a barcode.

Although these solutions are appropriate for fast location of carriers in the chain, they have unacceptable disadvantages. For example, the cost price of the transponders is too high to provide all carriers with a transponder. A disadvantage of readable graphical codes on each of the carriers lies in the reliable reading of these graphical codes with a high reading frequency. In particular, moisture and condensation may hinder the reading and the graphical codes will quickly deteriorate.

The aforementioned disadvantage of the known approach for determining the position of the chain in relation to the track also comes to the fore in connection with the "stretching out" of the chain. As mentioned, the chain may be very long and because, almost inevitably, the chain stretches during use (for example through wear), chain elements, including carriers, are in practice removed regularly, for example weekly, from the chain in order to compensate for the stretch. Also, as a result of faults or breakage of the chain, carriers are in practice removed from the chain by maintenance personnel. As a result of the removal of the chain elements, the chain as defined in the memory table no longer corresponds to the actual chain, so that a restore routine is required in order to re-establish said correspondence.

OBJECT OF THE INVENTION

The invention is intended to propose alternative measures which enable, for example, fast location of the carriers in the chain in relation to the track, whereby the reliability on the one hand and the costs of the location means on the other hand are both acceptable.

SUMMARY OF THE INVENTION

The invention proposes a device for the processing of slaughter animals or parts thereof, which is characterized in that, distributed over the chain of chain elements, a plurality of identifiable groups of one or more chain elements is provided, wherein, in each identifiable group, one or more chain elements have an identification mark, wherein an unidentifiable group of one or more unidentifiable chain elements is provided between a plurality of consecutive identifiable groups.

In accordance with this first measure which is simple to implement, it is thus provided for not just one identifiable chain element to be included in the chain, but for a plurality of identifiable groups, distributed (randomly or otherwise) over the length of the chain, to be included. An identifiable group may consist of a single identifiable chain element or a plurality of chain elements, preferably including at least one or more identifiable carriers, as will be explained below.

In an embodiment revealing practical advantages, one or more different types of chain element are present between adjacent carriers in the chain, for example links of a chain, a piece of cable or the like. However, systems are also known in which the carriers are not interconnected, for example in the case of a buffer or the like, where the carriers are temporarily placed at a variable distance from one another. Systems of this type also fall within the scope of this invention.

It is preferably provided that each identifiable chain element is an identifiable carrier which is provided with an associated identification mark. Alternatively, a chain element located between the carriers can be embodied as identifiable chain element, as in the solutions according to the prior art.

In a simple design, each identifiable group comprises a single identifiable carrier, and each identifiable carrier is provided with a unique identification mark, so that the location means can identify each identifiable carrier on the basis of the unique identification mark. In this way, a possible restore routine takes little time, depending of course on the distance between the identifiable carriers. Here, the number of unidentifiable carriers following an identifiable carrier may in each case be identical, but also variable, or even random.

In a different design, each identifiable group comprises a series of a plurality of carriers, wherein a plurality of carriers of each identifiable group are identifiable carriers and have an identification mark and possibly one or more carriers in the identifiable group are unidentifiable carriers, so that the combination of detectable identification marks and possible unidentifiable carriers provides a unique combination for each group, so that the location means can identify each identifiable group on the basis of this unique combination.

In a possible variant of the aforementioned design, the identifiable and unidentifiable carriers of an identifiable group provide a binary combination or similar combination, so that, in a system with, for example, identifiable groups of 8 carriers an 8-bit code, therefore comprising 256 unique combinations, can be obtained.

In a preferred design, it is provided that a plurality of identifiable groups, possibly all identifiable groups, in the chain are not unique and, in the case of a single identifiable carrier in each identifiable group, have the same identification marks or, in the case of a series comprising a plurality of carriers, have an identical combination of detectable identification marks and possible unidentifiable carriers.

If a plurality or even all identifiable groups are not uniquely identifiable, it is preferable for the location means to be set up so as to determine the position of the chain by:

detecting an identifiable group, counting the carriers of the following unidentifiable group, so that a combination of the detected identifiable group and the counted number of carriers of the unidentifiable group is obtained, analysing the memory table and identifying all occurrences of the combination therein, so that, if only one single occurrence is identified in the memory table, the position of the chain is determined, and, if a plurality of occurrences are identified in the memory table, detecting the following identifiable group, counting the number of carriers of the following unidentifiable group, so that a combination of the identifiable groups and the number of counted carriers of the unidentifiable groups is obtained, analysing the memory table and detecting all occurrences of the combination therein, so that, if only one occurrence is identified, the position of the chain is determined, and, if a plurality of occurrences are identified, repeating steps d), e) and f) until only a single occurrence is identified, so that the position of the chain is determined.

This design is based on the concept that a plurality of unidentifiable groups have a different number of carriers, and preferably the concept that all unidentifiable groups have a random number of carriers.

In this design, it must be noted that, as mentioned earlier, carriers are occasionally removed in practice during the operation of the device. This therefore results in a "random" number of carriers, even if, when starting to use the device for the first time, the number of carriers, in particular in the unidentifiable groups, had been predetermined.

The invention will be explained in detail below with reference to the drawings.

DETAILED DESCRIPTION OF PREFERRED EMBODIMENTS

Figure 1:
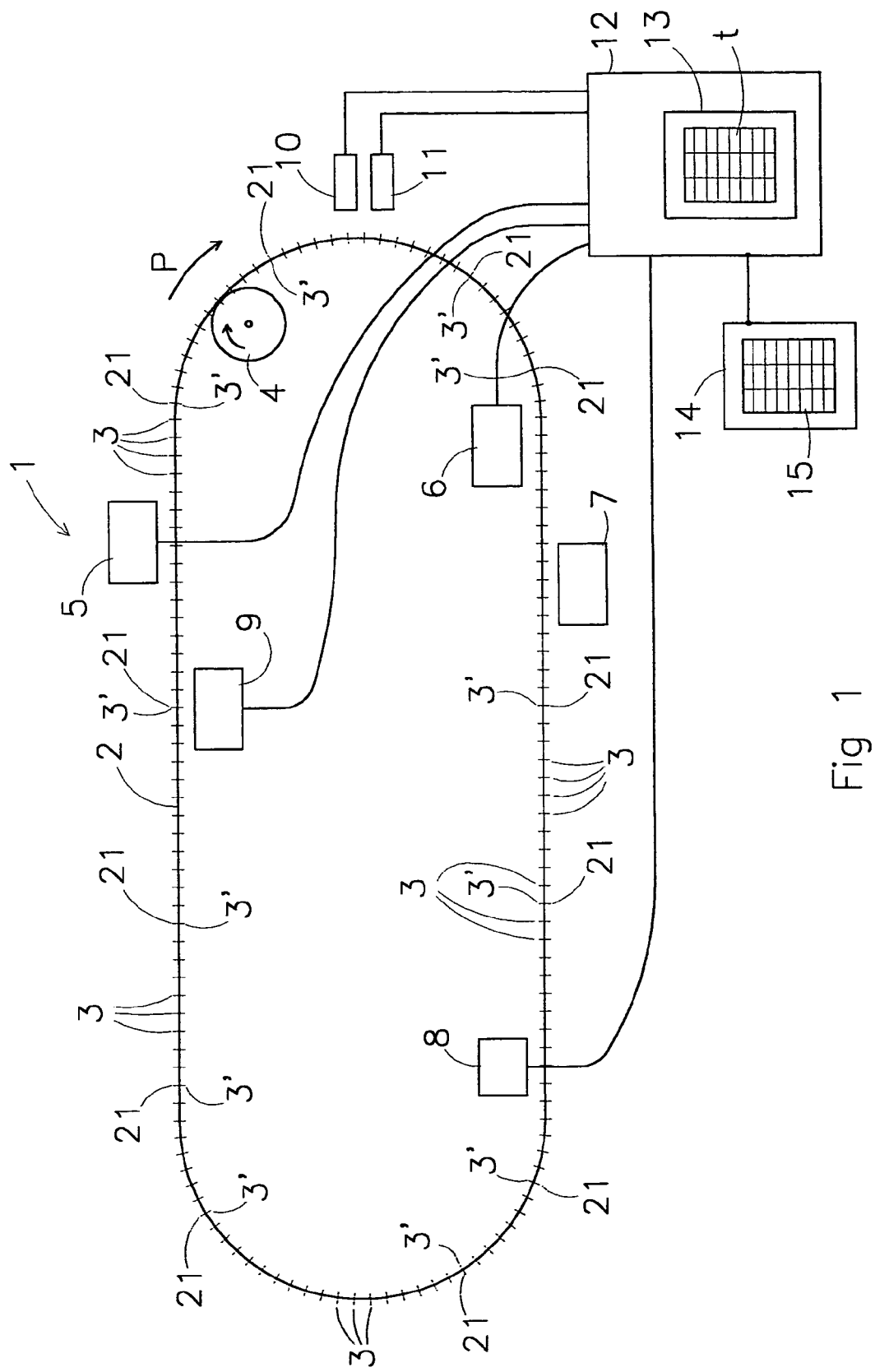
FIG. 1 schematically shows an embodiment of a device for processing slaughter animals according to the invention.

FIG. 1 shows a device 1 for processing slaughter animals or parts thereof, for example poultry.

The device 1 has a transport system with an endless track 2 and with a chain of carriers 3 placed behind one another, each being adapted to carry one or more slaughter animals or parts thereof and being interconnected and movable along the track 2.

Figure 2:
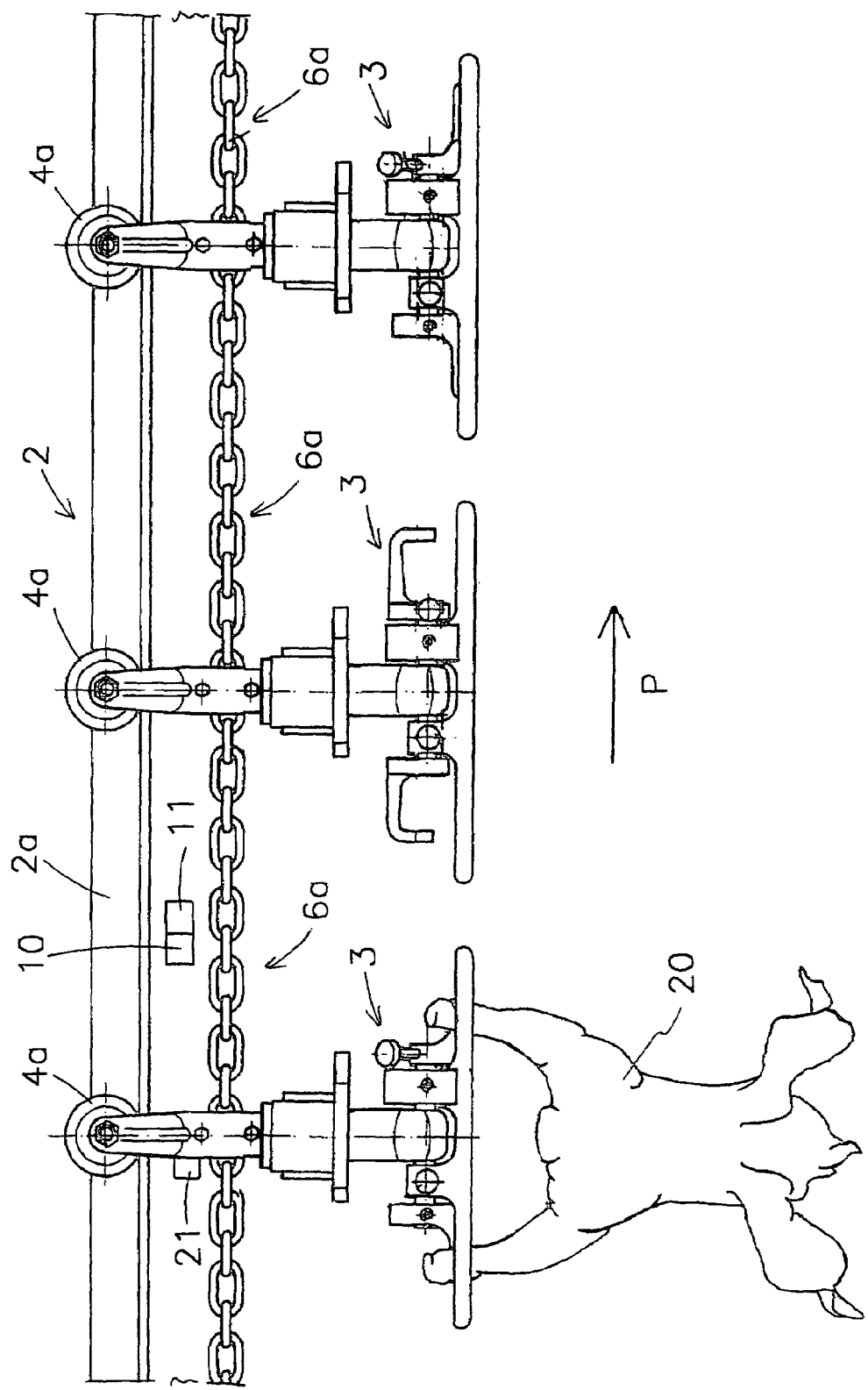
FIG. 2 shows a part of the device shown in FIG. 1.

As shown in FIG. 2, the track is formed by a guide rail 2a and the carriers 3 are movably attached to the rail 2a, for example with running wheels 4a, wherein the carriers 3 are furthermore interconnected, for example by means of a flexible connecting element such as a chain with links 6a, cable or the like.

The device 1 furthermore comprises drive means 4 for moving the chain of carriers 3 along the track 2 in the direction of transport "P".

In FIG. 2, the carriers 3 are adapted to carry poultry 20.

In a delivery station 5, a slaughter animal 20 or one or more parts thereof are fed to a carrier 3 of the transport system.

Along the track 2, one or more stations 6, 7, 8, are set up to perform actions relating to the slaughter animals or parts thereof, for example cutting off parts of the slaughter animal, carrying out an inspection, etc. In a device with a plurality of transport systems, one station may be a "transfer station", where a slaughter animal or part (parts) thereof are transferred from one system to the other.

The device 1 furthermore comprises a discharging station 9 for discharging the slaughter animals or parts thereof from the carriers 3.

The transport system is provided with location means, which will be explained in detail, for determining the position of the chain of carriers 3 in relation to the track 2.

The location means are based on the principle that a plurality of identifiable groups of carriers are distributed along the length of the chain, which in practice may comprise hundreds or even (tens of) thousands of carriers 3, wherein one or more carriers in each identifiable group have an identification mark. Furthermore, an unidentifiable group of one or more unidentifiable carriers is in each case present between successive identifiable groups.

For example, in the case of a chain length of 30,000 carriers, approximately 1500 identifiable groups are present, so that the average length of an unidentifiable group of carriers is approximately 20 carriers.

An identification sensor 10 is set up along the track 2 to detect each identifiable carrier 3. Furthermore, a counting device 11 is set up along the track 2 at a counting position, here the same position as the identification sensor 10, to count the unidentifiable carriers passing along the counting position following the passage of an identifiable carrier 3.

The location means furthermore comprise a computer 12 with electronic memory means 13 with a memory table "t", in which at least one memory field is provided for each carrier 3. For each carrier 3, the location means record a variable in a memory field which, in the case of an identifiable carrier, represents the detected identification mark, and which, in the case of an unidentifiable carrier, represents the number of carriers 3 counted by the counting device 11 since the passage of the identifiable group located upstream therefrom in the chain. When the device is put into operation, it is preferably provided that the table "t" is "loaded" with the chain, i.e., on the basis of the data from the sensor 10 and the counting device 11, the current composition of the chain is stored in the table t.

A back-up memory 14 is actively connected to the computer 12. For example, the table t, or at least a part thereof, is copied to a back-up table 15 in the back-up memory 14. For example, in the memory 14, a fault-resistant battery feed is provided, which keeps the back-up memory 14 active, even if the mains power supply or the like fails.

It is preferably provided that, in the event of any fault which may affect the determination of the position of the chain in relation to the track 2, such as, for example, a transport system restart following a fault clearance or a power failure affecting the computer 12, as a result of which the table t is lost or becomes unreliable, the contents of the table 15 are copied back to the working table t.

It will be clear that the aforementioned operation of the location means during the operation of the device can also be performed continuously in order to thus compare the passage of the carriers with the table and possibly carry out corrective actions and/or transmit fault messages.

On the basis of the principle described above, wherein a plurality of identifiable groups are present, distributed along the chain, different designs can be implemented, of which a number of relevant variants are described in detail below.

In a simple version, each identifiable group comprises a single identifiable carrier, and each identifiable carrier is provided with a unique identification mark, for example a transponder, so that the location means can identify each identifiable carrier on the basis of the unique identification mark. In relation to the concept described above which falls outside the scope of the invention, wherein each carrier in the entire chain is provided with a unique identification, this solution offers not only the possibility of making substantial savings on the cost price of the transponders, but moreover the majority of the carriers will be designed as unidentifiable carriers. If carriers are replaced, relocated or removed, this is much simpler for maintenance personnel than if a unique identification mark has to be taken into account.

In a different version, each identifiable group comprises a series of a plurality of carriers possibly with intermediate chain elements, wherein a plurality of carriers of each identifiable group are identifiable carriers and each have an identification mark, and wherein possibly one or more carriers in the identifiable group are unidentifiable carriers, so that the combination of detectable identification marks of the identifiable carriers and possible unidentifiable carriers provides a unique combination for each identifiable group, so that the location means can identify each identifiable group on the basis of this unique combination.

In a possible design hereof, the identifiable and unidentifiable carriers of an identifiable group provide a binary combination or the like.

Particularly in the aforementioned versions, it can be envisaged that the unidentifiable groups present between all pairs of adjacent identifiable groups in the chain in each case have an identical number of unidentifiable carriers. It is noted that this situation is virtually impossible in practice given the "need" to remove carriers in order to compensate for "stretch" of the chain.

The device according to the invention is preferably designed in such a way that a plurality of identifiable groups, possibly all identifiable groups, are not unique in the chain. These groups then have, in the case of a single identifiable carrier for each identifiable group, the same identification mark or, in the case of a series of a plurality of carriers, an identical combination of detectable identification marks and possible unidentifiable carriers.

In the aforementioned embodiment, the location means are preferably set up to determine the position of the chain by:

detecting an identifiable group, counting the carriers of the following unidentifiable group, so that a combination of the detected identifiable group and the counted number of carriers of the unidentifiable group is obtained, analysing the table t and identifying all occurrences of the combination therein, so that, if only one single occurrence is identified in the memory table, the position of the chain is determined, and, if a plurality of occurrences are identified in the memory table, detecting the following identifiable group, counting the number of carriers of the following unidentifiable group, so that a combination of the identifiable groups and the number of counted carriers of the unidentifiable groups is obtained, analysing the memory table and detecting all occurrences of the combination therein, so that, if only one occurrence is identified, the position of the chain is determined, and, if a plurality of occurrences are identified, repeating steps d), e) and f) until only a single occurrence is identified, so that the position of the chain is determined.

This method makes it possible, as is preferable, that all unidentifiable groups in the chain have a random number of carriers 3.

Many variants are possible within the scope of the aforementioned method.

In a simple variant, each identifiable group comprises a single identifiable carrier and all identifiable carriers in the chain are provided with an identical identification mark. For example, each identifiable carrier is provided with a magnetic element 21 (see FIG. 2) and the identification sensor 10 is a magnetic-field sensor which can detect the passage of a carrier with a magnetic element. In FIGS. 1 and 2, a carrier of this type is provided with the reference number 3'. The remaining carriers 3 are designed without such a magnetic element.

Using the variation in the number of carriers in the unidentifiable groups, the position of the chain in relation to the track can then be determined.

The location means will, for example when the device is restarted following a fault clearance, detect an identifiable carrier with the sensor 10, and will then count the number of carriers 3 of the following unidentifiable group. The resulting combination of detected identification marks and the number of carriers in the following unidentifiable group is then searched for in the table t. This table t may, as previously mentioned, be copied back from the back-up memory 14.

If the combination concerned occurs only once in the table t, it is then clear which carriers in the chain have been detected, and the position of the chain in relation to the track 2 is therefore also known.

However, it is also possible that the combination occurs several times in the table t, so that the position of the chain in relation to the track is not yet determined.

In this case, and this may in any event already occur in the meantime, the following identifiable carrier is detected and the number of carriers in the following unidentifiable group is counted.

As a result, a combination is obtained comprising the series of the first identifiable carrier, the first following unidentifiable group, the second identifiable carrier, and the second following identifiable group.

A search for all occurrences of this more extended combination is then carried out in the table t.

If the more extended combination occurs once only, the position of the chain is known. If this combination also occurs several times in the table t, the combination is even further extended in the same manner with a further identifiable group and the number of carriers in the following unidentifiable group, and is compared with the table. This occurs until the combination is unique in the table t.

It is conceivable that no unidentifiable groups are positioned between some identifiable carriers, i.e. that one identifiable group (or perhaps a single identifiable carrier) directly follows the preceding identifiable group. One of skill in the art will understand that this does not represent a departure from the aforementioned approach, as long as unidentifiable groups are present elsewhere along the chain. As mentioned, the aim is, in practice, essentially to design the majority of carriers as unidentifiable carriers.

If carriers are removed from the chain, the effect is that the sensor 10 and the counting device 11 perform a detection for the "relatively small" part of the chain which deviate from the contents of the table 13. An automatic correction of the table t then preferably takes place, whereby the removal of the carriers 3 from the chain is automatically processed in the table t.

It will be clear that, in practice, the memory table t in the memory 13 has a series of a plurality of memory fields for each carrier 3, 3', wherein a variable representing the product(s) carried by the relevant carrier can be stored in each case in one or more fields.

The design of the identification mark of an identifiable carrier may be of any given type. Preferably, the identification mark comprises a magnetic element 21, which is fitted to the carrier 3'.

Another option is that the identification sensor 10 is an inductive sensor and the identification mark 21 is suitable for detection by the inductive sensor.

A further option is that the sensor 10 is an optical identification sensor and the identification mark 21 is an optically detectable identification mark. The identification sensor is possibly a colour sensor.

As mentioned, the identification mark 21 could also be a transponder and the identification sensor 10 a reading device for the transponder.

It is also conceivable that the identification sensor 21 is a graphical code, for example a barcode, and the identification sensor 10 is a reading device for the graphical code.

It is furthermore conceivable that the chain or an identifiable group includes identifiable carriers with differently designed identification marking, for example with magnetic elements, and other identifiable carriers with a colour element.

As indicated above, a device may comprise a plurality of transport systems, each being provided with associated location means.

What is claimed is:

1. A device for processing slaughter animals or parts thereof comprising:
   a. a transport system comprising:
      i. an endless track;
      ii. a chain of chain elements moveable along the track and comprising a plurality of carriers, each carrier for carrying at least one slaughter animal or part thereof, wherein at least some of the chain elements are identifiable chain elements having an identification mark and wherein at least some of the chain elements are unidentifiable chain elements not having an identification mark, wherein distributed along the chain are provided:
         a) a plurality of identifiable groups, each comprising at least one identifiable chain element; and
         b) a plurality of unidentifiable groups, each comprising at least one unidentifiable chain element,
      wherein each unidentifiable group is positioned along the chain between adjacent identifiable groups; and
      iii. drive means for moving the chain along the track in a direction of transport;
   b. a delivery station for delivering slaughter animals or parts thereof to the carriers;
   c. at least one station positioned along the track for performing actions relating to the slaughter animals or parts thereof; and
   d. location means for determining the position of the chain relative to the track, wherein the location means comprises:
      i. an identification sensor positioned along the track to detect each identifiable chain element which passes by the sensor;
      ii. a counting device to count the carriers which pass by the sensor following passage of an identifiable group; and
      iii. electronic memory means comprising a memory table having a memory field for each carrier,
   wherein the location means is adapted to record in the memory field of a particular carrier a variable representing the number of carriers, including the particular carrier, counted by the counting device since the location means last detected an identifiable group.

2. The device of claim 1, wherein at least one chain element is present between at least some adjacent carriers in the chain and wherein the at least one chain element is different from the adjacent carriers.

3. The device of claim 1, wherein each identifiable chain element is an identifiable carrier having an identification mark.

4. The device of claim 1, wherein each identifiable group comprises a single identifiable carrier having a unique identification mark different from the carriers of the other identifiable groups, wherein the location means identifies each identifiable carrier on the basis of the unique identification mark.

5. The device of claim 3, wherein each identifiable group comprises a series of identifiable carriers each having an identification mark, wherein the series of identification marks of the plurality of identifiable carriers in each identifiable group provides a unique combination for each identifiable group and wherein the location means identifies each identifiable group on the basis of the unique combination of the identifiable group.

6. The device of claim 3, wherein each identifiable group comprises a combination of identifiable carriers which each have an identification mark and at least one unidentifiable carrier, wherein the combination of identification marks of the identifiable carriers and the at least one unidentifiable carrier provides a unique combination for each identifiable group and wherein the location means identifies each identifiable group on the basis of the unique combination of the identifiable group.

7. The device of claim 5, wherein the unique combination for each identifiable group comprises a unique binary combination.

8. The device of claim 6, wherein the unique combination for each identifiable group comprises a unique binary combination.

9. The device of claim 1, wherein the unidentifiable groups each comprise an identical number of unidentifiable carriers.

10. The device of claim 1, wherein a plurality of identifiable groups in the chain are not unique.

11. The device of claim 10, wherein the location means is adapted to determine the position of the chain by:
    a) detecting a first identifiable group along the chain,
    b) counting the number of carriers in a first unidentifiable group positioned along the chain behind the first identifiable group, so that a first combination of the first identifiable group and the first unidentifiable group is obtained,
    c) analyzing the memory table and identifying all occurrences of the first combination in the memory table.

12. The device of claim 11, wherein, if a plurality of occurrences are identified in the memory table, steps a), b), and c) are repeated for additional combinations of identifiable and unidentifiable groups positioned along the chain behind the first combination until only a single occurrence is identified.

13. The device of claim 11, wherein at least some of the unidentifiable groups comprise a number of unidentifiable carriers different from a number of unidentifiable carriers in other of the unidentifiable groups.

14. The device of claim 11, wherein each unidentifiable group has a random number of carriers.

15. The device of claim 1, wherein the memory table comprises a plurality of memory fields for each carrier.

16. The device of claim 15, wherein at least one of the plurality of memory fields for each carrier is adapted to store a variable representing data relating to the animal or part thereof carried by the carrier.

17. The device of claim 1, wherein the device further comprises back-up memory means for storing a copy of the memory table.

18. The device of claim 1, wherein the identification sensor comprises a magnetic-field sensor and wherein at least some of the identifiable chain elements have an identification mark comprising a magnetic element.

19. The device of claim 1, wherein the identification sensor comprises an inductive sensor for detecting the identification marks of at least some of the identifiable chain elements.

20. The device of claim 1, wherein the identification sensor comprises an optical identification sensor for detecting the identification marks of at least some of the identifiable chain elements.

21. The device of claim 20, wherein the optical identification sensor comprises a color sensor.

22. The device of claim 1, wherein at least some of the identifiable chain elements have an identification mark comprising a transponder and wherein the identification sensor comprises a device for reading transponders.

23. The device of claim 1, wherein at least some of the identifiable chain elements have an identification mark comprising a graphical code and wherein the identification sensor comprises a device for reading graphical codes.

24. The device of claim 1, wherein the device comprises a plurality of transport systems, each having an associated location means.

25. A method for processing slaughter animals or parts thereof comprising:
  a. delivering slaughter animals or parts thereof to a plurality of carriers, wherein each carrier is adapted to carry at least one slaughter animal or part thereof;
  b. transporting the carriers using a transport system comprising:
    i. an endless track;
    ii. a chain of chain elements moveable along the track and comprising the plurality of carriers, wherein at least some of the chain elements are identifiable chain elements having an identification mark and wherein at least some of the chain elements are unidentifiable chain elements not having an identification mark, wherein distributed along the chain are provided:
      a) a plurality of identifiable groups, each comprising at least one identifiable chain element; and
      b) a plurality of unidentifiable groups, each comprising at least one unidentifiable chain element, wherein each unidentifiable group is positioned along the chain between adjacent identifiable groups; and
    iii. drive means for moving the chain along the track in a direction of transport;
  c. performing actions relating to the slaughter animals or parts thereof; and
  d. determining the position of the chain relative to the track by:
    i. detecting each identifiable chain element which passes by an identification sensor;
    ii. counting the carriers which pass by the sensor following passage of an identifiable group; and
    iii. recording in a memory table for each particular carrier a variable representing the number of carriers, including the particular carrier, counted since detection of an identifiable group.

26. The method of claim 25, wherein a plurality of identifiable groups in the chain are not unique and wherein at least some of the unidentifiable groups comprise a number of unidentifiable carriers different from a number of unidentifiable carriers in other of the unidentifiable groups, wherein determining the position of the chain relative to the track further comprises:
  a) detecting a first identifiable group along the chain,
  b) counting the number of carriers in a first unidentifiable group positioned along the chain behind the first identifiable group, so that a first combination of the first identifiable group and the first unidentifiable group is obtained,
  c) analyzing the memory table and identifying all occurrences of the first combination in the memory table.

27. The method of claim 26, wherein, if a plurality of occurrences are identified in the memory table, the method further comprises repeating steps a), b), and c) for additional combinations of identifiable and unidentifiable groups positioned along the chain behind the first combination until only a single occurrence is identified.

28. The method of claim 25, wherein, upon resuming transporting of the carriers after a stoppage of the transport system, the position of the chain in relation to the track is determined.

29. The method of claim 25, further comprising storing a copy of the memory table in a back-up table.

\* \* \* \* \*